United States Patent
Beek

(10) Patent No.: US 12,091,529 B2
(45) Date of Patent: Sep. 17, 2024

(54) PROCESS FOR VULCANIZING A REINFORCED RUBBER COMPOSITION

(71) Applicant: NOURYON CHEMICALS INTERNATIONAL B.V., Amsterdam (NL)

(72) Inventor: Waldo Joseph Elisabeth Beek, Deventer (NL)

(73) Assignee: NOURYON CHEMICALS INTERNATIONAL B.V., Amsterdam (NL)

( * ) Notice: Subject to any disclaimer, the term of this patent is extended or adjusted under 35 U.S.C. 154(b) by 0 days.

(21) Appl. No.: 18/046,998

(22) Filed: Oct. 17, 2022

(65) Prior Publication Data
US 2023/0084880 A1 Mar. 16, 2023

Related U.S. Application Data

(63) Continuation of application No. 16/968,302, filed as application No. PCT/EP2019/052842 on Feb. 6, 2019, now Pat. No. 11,505,677.

(30) Foreign Application Priority Data

Feb. 9, 2018 (EP) ..................................... 18156093

(51) Int. Cl.
  *C08K 9/12* (2006.01)
  *C08K 3/04* (2006.01)
  *C08K 5/14* (2006.01)
  *C08K 5/18* (2006.01)
  *C08K 5/37* (2006.01)

(52) U.S. Cl.
  CPC .................. *C08K 9/12* (2013.01); *C08K 3/04* (2013.01); *C08K 5/14* (2013.01); *C08K 5/18* (2013.01); *C08K 5/37* (2013.01)

(58) Field of Classification Search
  CPC .................................... C08K 5/18; C08K 5/14
  See application file for complete search history.

(56) References Cited

U.S. PATENT DOCUMENTS

| | | | |
|---|---|---|---|
| 4,332,918 A | 6/1982 | Fukahori et al. | |
| 4,631,304 A | 12/1986 | Wilder | |
| 5,245,084 A | 9/1993 | Groepper et al. | |
| 5,292,815 A | 3/1994 | Wreesmann et al. | |
| 6,943,220 B2 | 9/2005 | Matsunaga et al. | |
| 7,241,824 B2 | 7/2007 | Mangeret et al. | |
| 9,034,950 B2 | 5/2015 | Mihara et al. | |
| 9,840,600 B2 | 12/2017 | Naito et al. | |
| 2004/0249048 A1 | 12/2004 | Mangeret et al. | |
| 2017/0267834 A1 | 9/2017 | Palys et al. | |
| 2018/0134864 A1 | 5/2018 | Cao et al. | |

FOREIGN PATENT DOCUMENTS

| | | | | |
|---|---|---|---|---|
| CN | 1384140 A | | 12/2002 | |
| CN | 1414993 A | | 4/2003 | |
| CN | 102218879 A | | 10/2011 | |
| CN | 105602023 A | * | 5/2016 | ............... C08L 7/00 |
| CN | 106674632 A | * | 5/2017 | ............ B29B 7/005 |
| CN | 107531832 A | | 1/2018 | |
| CN | 107531942 A | | 1/2018 | |
| JP | H04311746 A | | 11/1994 | |
| JP | 2011148895 A | | 8/2011 | |
| JP | 4817456 B2 | | 11/2011 | |
| JP | 2014159505 A | | 9/2014 | |
| JP | 2014534991 A | | 12/2014 | |
| TW | 201704318 A | * | 2/2017 | ............... B60C 1/00 |
| WO | 2012023607 A1 | | 2/2012 | |

OTHER PUBLICATIONS

Machine translation of CN-106674632-A (Year: 2017).*

* cited by examiner

*Primary Examiner* — Wenwen Cai
(74) *Attorney, Agent, or Firm* — Lorenz & Kopf, LLP

(57) ABSTRACT

Process for preparing a reinforced rubber composition, said process comprising the step mixing, at a temperature of at least 120° C., at least the following compounds: (i) a rubber, (ii) at least one inorganic filler, (iii) at least one organic peroxide, and (iv) at least one anti-oxidant selected from phenolics, para-phenylidene diamines, and nitroxides.

18 Claims, No Drawings

PROCESS FOR VULCANIZING A REINFORCED RUBBER COMPOSITION

CROSS-REFERENCE TO RELATED APPLICATION

This application is a continuation of U.S. application Ser. No. 16/968,302, filed on Aug. 7, 2020, which was the U.S. National-Stage entry under 35 U.S.C. § 371 based on International Application No. PCT/EP2019/052842, filed Feb. 6, 2019, which was published under PCT Article 21(2) and which claims priority to European Application No. 18156093.9, filed Feb. 9, 2018, which are all hereby incorporated in their entirety by reference.

TECHNICAL FIELD

The present disclosure relates to a process for reinforcing rubber compositions.

BACKGROUND

In order for rubbers to be used in tyres, their strength has to be enhanced by reinforcement. Such reinforcement is conducted by incorporation of a filler. Carbon black and silica are the most common fillers for this purpose. For proper reinforcement, the interaction between filler and rubber should be strong and the filler should be well dispersed throughout the rubber.

A dispersed filler will show filler-rubber interaction but also filler-filler interaction. Even when well dispersed, filler particles will still influence and interact with each other. Although this filler-filler interaction improves the strength of the system, it also leads to frictional (dissipative) energy losses when de rubber is used in dynamic applications, such as rolling tyres.

For silica fillers, the interaction between rubber and filler can be tuned using coupling agents like silanes. For carbon blacks, such coupling agents are not common, not very efficient, and not commercially used.

BRIEF SUMMARY

This disclosure provides a process for preparing a reinforced rubber composition, said process comprising the step of mixing, at a temperature of at least about 120° C., at least the following compounds: (i) a rubber, (ii) at least one inorganic filler, (iii) at least one organic peroxide, and (iv) at least one anti-oxidant selected from phenolics, para-phenylidene diamines, and nitroxides.

This disclosure also provides a process for vulcanizing a reinforced rubber composition comprising the steps of: preparing a mixture comprising (a) a reinforced rubber composition that has been obtained by mixing, at a temperature of at least about 120° C., at least the following compounds: (i) a rubber, (ii) at least one inorganic filler, (iii) at least one organic peroxide, and (iv) at least one anti-oxidant selected from phenolics, para-phenylidene diamines, and nitroxides, and (b) a cure package. The process also includes the step of shaping and heating said mixture to instigate vulcanization.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

It is therefore an object of the present disclosure to provide a method for improving the interaction between various inorganic fillers and rubbers, without the need for coupling agents. At the same time, it would also be desirable to decrease the hysteresis of the cured compounds when dynamically stressed (for instance under rolling conditions). Under rolling conditions, the dissipated hysteretic energy is lost as heat, which leads to a higher rolling resistance and a poorer fuel economy.

This object has been met by treating a mixture of rubber and inorganic filler with an organic peroxide prior to vulcanisation of the rubber.

Without being bound to theory, we suspect the mechanism by which the organic peroxide radicals alter the filler-rubber interaction by forming crosslinks close to the rubber-filler interface.

It has further been observed that specific anti-oxidant(s) need to be present during this treatment. Addition of these chemicals allows control over the activity of the peroxide. Without these anti-oxidants, the peroxides will initiate premature crosslinking of the rubber and the formation of undesirable gel. In addition, the antioxidants ensure that the peroxide does not negatively impact the processing properties of the treated rubber.

According to the disclosure, a mixture comprising both rubber and filler is modified by using the organic peroxide. The present disclosure thus does not relate to pre-modification of the filler alone, nor of the rubber alone. Instead, the filler and the rubber are treated with the peroxide when in intimate admixture and in the presence of the one or more anti-oxidants.

The present disclosure therefore relates to a process for preparing a reinforced rubber composition, said process comprising the step of mixing, at a temperature of at least about 120° C., at least the following compounds:

(i) a rubber,
(ii) at least one inorganic filler,
(iii) at least one organic peroxide, and
(iv) at least one anti-oxidant selected from phenolics, para-phenylidene diamines, and nitroxides.

According to this process, a temperature of at least about 120° C. is applied to all these components, including the organic peroxide, during the actual mixing of these components. This process thereby differs from conventional peroxide-initiated crosslinking/vulcanisation processes, in which the peroxide is mixed into a polymer-filler mixture at significantly lower temperatures in order to prevent the peroxide from decomposing and initiating crosslinking/vulcanisation prior to shaping (e.g. extrusion or moulding).

The reinforced rubber composition is prepared by mixing a rubber, at least one inorganic filler, at least one organic peroxide, and at least one anti-oxidant selected from phenolics, para-phenylidene diamines, and nitroxides. The actual temperature in the mixing equipment may vary, depending on the initial temperature setting, the amount of materials used, the mixer rotor speed, the cooling capacity, and the mixing time. In a typical mixing experiment the temperature will show a ramp. The temperature during mixing should rise to at least about 120° C., preferably at least about 130° C., and most preferably at least about 140° C. The temperature preferably does not exceed about 190° C., more preferably about 180° C.

The temperature should be sufficient to decompose all or the majority of the organic peroxide(s) that were added to the mixture. In a preferred embodiment, at least 90% of the total amount of organic peroxide that was added is decomposed during this step. This can be determined by measuring the residual reactivity of the treated but uncured compound in a rheometer.

The mixing can be performed in, for example, a multi-roll mill (e.g. a heated two-roll mill), a screw mill, a continuous mixer, a compounding extruder, a (BUSS) kneader, a tangential type mixer (e.g. a Banbury mixer), an intermeshing type mixer, or an internal mixer.

Mixing would generally require about 1-20 minutes.

In addition to the above-mentioned components, the rubber composition can contain additional compounds, such as conventional stabilizers (anti-ozonants, heat stabilizers, UV stabilizers, voltage stabilizers), extender (processing) oils, low molecular weight elastomers (e.g. liquid butadiene rubber), tackifiers, waxes, pigments, lubricants, blowing agents, nucleating agents, water tree retardants, metal deactivators, silanes, dyes, and colorants.

Examples of suitable extender oils are Mild Extraction Solvate (MES), Treated Distillate Aromatic Extract (TDAE), treated residual aromatic extract (TRAE), and naphthenic and paraffinic oils. Very high aromatic oils, such as distillate aromatic extract (DAE) oils, are preferably not used, since they are classified as carcinogenic and banned from use in tyres in the European Union, due to the presence of polycyclic aromatic hydrocarbons (PAH).

Examples of silanes are bis(triethoxysilylpropyl)tetrasulfide (Si69), 3-octanoylthio-1-propyltriethoxysilane (NXT), 3-mercaptopropyl-di(tridecan-1-oxy-13-penta (methylene oxi-de)) ethoxysilane (Si363), and triethoxy vinylsilane.

These additional compounds can be added to the rubber before its mixing with organic peroxide, anti-oxidant, and filler, but may also be added after or together with any of these ingredients.

The order in which rubber, inorganic filler, peroxide, and anti-oxidant are combined is not relevant. However, it is preferred that the antioxidant is present before the peroxide decomposes as a result of the imposed temperature. If, at the mixing stage, the temperature can be controlled below the decomposition temperature of the peroxide, the order of addition becomes irrelevant.

In one embodiment, rubber is pre-compounded with the filler and the optional additional compounds prior to the addition of peroxide and anti-oxidant. It is also possible to pre-compound the rubber with both the filler, the anti-oxidant, and the optional additional compounds prior to the addition of peroxide. It is further possible to pre-compound the rubber with the filler, prior to the addition of the anti-oxidant, optional additional compounds (e.g. processing oil), and peroxide. Another possibility is to add all components (anti-oxidant(s), filler(s), organic peroxide, and optional additional compounds) at more or less the same time, sequentially or in admixture.

During the mixing, no sulfur, sulfur accelerators, or sulfur donors are present. These materials can be added at a later stage, after the rubber and the filler have been pre-treated with organic peroxide and anti-oxidant, when vulcanisation is to be conducted.

The organic peroxide can be added to the rubber and inorganic filler as neat organic peroxide, or in the form of a formulation comprising the organic peroxide dissolved or dispersed in a dispersing medium. Examples of dispersing media are solvents, inorganic carriers, and rubbers.

In one embodiment, the organic peroxide and, optionally, the at least one anti-oxidant are added to the rubber and the inorganic filler in the form of a solid formulation comprising about 10-50 wt %, preferably about 15-40 wt % of organic peroxide and about 0-50 wt %, preferably about 5-45 wt %, more preferably about 10-40 wt % of the anti-oxidant, dispersed on about 5-45 wt %, preferably about 10-40 wt % of a solid inorganic carrier; all based on the weight of the total formulation.

Suitable solid inorganic carriers include (precipitated or pyrogenic) silica, carbon black, (precipitated or natural) calcium carbonate, clay, chalk, talc, aluminium hydroxide, and magnesium hydroxide. The solid inorganic carrier may be equal to or differ from the inorganic filler that present in reinforced rubber composition.

The disclosure therefore also relates to a solid formulation comprising about 10-50 wt %, preferably about 15-40 wt %, preferably about 15-40 wt % of organic peroxide and about 5-50 wt %, preferably about 5-45 wt %, more preferably about 10-40 wt % of at least one anti-oxidant selected from phenolics, para-phenylidene diamines, and nitroxides dispersed on about 5-45 wt %, preferably about 10-40 wt % of at least one solid inorganic carrier; all based on the weight of the total formulation.

In another embodiment, the organic peroxide and optionally the at least one anti-oxidant is/are added to the rubber in the form of a masterbatch comprising about 10-50 wt %, preferably about 15-40 wt % of organic peroxide, about 0-50 wt %, preferably about 5-45 wt %, more preferably about 10-40 wt % of the at least one anti-oxidant, and about 0-50 wt %, preferably about 5-45 wt %, more preferably about 10-40 wt % solid inorganic carrier, all dispersed in about 10-50 wt % rubber; all based on the weight of the total formulation.

The disclosure therefore also relates to a solid formulation in the form of a masterbatch comprising about 10-50 wt %, preferably about 15-40 wt % organic peroxide, about 0-50 wt %, preferably about 5-45 wt %, more preferably about 10-40 wt % of at least one solid inorganic carrier, and about 5-50 wt %, preferably about 5-45 wt %, more preferably about 10-40 wt % of at least one anti-oxidant selected from phenolics, para-phenylidene diamines, and nitroxides, dispersed in about 10-50 wt % rubber; all based on the weight of the total formulation.

In another embodiment, the organic peroxide and optionally the at least one anti-oxidant are added to the rubber and the inorganic filler in the form of a formulation comprising about 10-50 wt %, preferably about 15-40 wt % of organic peroxide, about 0-50 wt %, preferably about 5-45 wt %, more preferably about 10-40 wt % of the anti-oxidant, and about 0-50 wt %, preferably about 5-45 wt %, more preferably about 10-40 wt % of a solvent.

Suitable solvents include isododecane, odorless mineral spirits (OMS), other conventional aliphatic solvents, and extender oils used for the production of the rubber compounds, such as the extender oils discussed above.

The disclosure therefore also relates to a liquid formulation comprising about 10-50 wt % preferably about 15-40 wt % of organic peroxide, about 5-50 wt %, preferably about 5-45 wt %, more preferably about 10-40 wt % of at least one anti-oxidant selected from phenolics, para-phenylidene diamines, and nitroxides, and about 0-50 wt %, preferably about 5-45 wt % more preferably about 10-40 wt % of a solvent.

In a further embodiment, the organic peroxide is added to the rubber in the form of a formulation comprising the organic peroxide dispersed on the inorganic filler. For instance, the organic peroxide can be dispersed on silica or carbon black.

The present disclosure also relates to a solid formulation comprising about 10-80 wt %, preferably about 20-80 wt %, more preferably about 30-80 wt %, and most preferably about 30-50 wt % organic peroxide dispersed on about 20-90 wt %, preferably about 20-80 wt %, more preferably about 20-70 wt %, and most preferably about 50-70 wt % carbon black.

The organic peroxide in this formulation is preferably selected from the group of 1,1-di(tert-butylperoxy)cyclohexane, 1-di(tert-butylperoxy)-3,3,5-trimethylcyclohexane, 2,2-di(tert-butylperoxy)butane, and 1,1-bis(tert-butylperoxy)-2-isopropyl-5-methylcyclohexane.

This formulation can be prepared by dosing a liquid or liquidified peroxide to the filler, using equipment suitable to mix liquids and solids. An example of such equipment is a plough share mixer (Lodige mixer).

The term "rubber" in this specification includes natural and synthetic rubbers, but also elastomers like ethylene propylene diene terpolymer elastomer (EPDM), ethylene-propylene copolymer elastomer (EPM), and ethylene-vinyl acetate (EVA and EVM).

Examples of suitable rubbers are natural rubber (NR), butyl rubber (BR), isoprene rubber (IR), bromobutylrubber (BIIR), styrene-butadiene rubber (including e-SBR and s-SBR), polysulfides (T), butyl rubber (IIR), Nitrile rubber (NBR), Hydrogenated nitrile rubber (HNBR), EPM, EPDM, EVA, EVM, and blends thereof. Examples of blends are NR/BR en SBR/BR blends.

Suitable inorganic fillers are (precipitated or pyrogenic) silica, carbon black, (precipitated or natural) calcium carbonate, clay, chalk, talc, aluminium hydroxide, magnesium hydroxide, and combinations thereof. Preferred combinations combine carbon black with any other filler. Silica, carbon black, and their combination are the preferred inorganic fillers for use in the process of the present disclosure.

Examples of carbon black are furnace black (also called petroleum black and prepared by the partial combustion of an aromatic hydrocarbon-containing liquids), high abrasive furnace black, gas furnace black, acetylene black (prepared by a thermal decomposition process at about 800-1000° C. and atmospheric pressure), lamp black (produced by the combustion of various liquids or raw materials in the absence of air), flame black (also called smoke black), channel black (obtained by small-flame combustion), thermal black (produced by decomposition of natural gas or liquid hydrocarbons in the absence of air or flame), and electrically conductive carbon black.

Examples of suitable silicas are (amorphous) precipitated silicas (e.g. Ultrasil® VN3 GR), high dispersion precipitated silica (e.g. Ultrasil® 7000 GR), and thermal/fumed silica (Aerosil® grades).

The content of inorganic filler in the reinforced rubber composition can vary over a wide range, depending on the type of filler, the specific application of the reinforced rubber composition, and the other components present in the composition (amount of oil, plasticizers, waxes, etc.). For carbon black, a rough estimate would be about 50-300 phr. For silica, a rough estimate would be about 50-110 phr.

Preferred organic peroxides are peroxyesters and peroxy ketals. Most preferred are peroxy ketals. These peroxides are not (very) sensitive to destruction by carbon black and give sufficient amounts of radicals.

Examples of suitable peroxyesters are tert-butyl peroxy-2-ethylhexanoate and tert-butyl-peroxy-3,5,5-trimethyl-hexanoate.

Examples of suitable peroxy ketals are 1,1-di(tert-butylperoxy)cyclohexane, 1-di(tert-butylperoxy)-3,3,5-trimethyl-cyclohexane, 2,2-di(tert-butylperoxy) butane, and 1,1-bis(tert-butylperoxy)-2-isopropyl-5-methylcyclohexane.

The reinforced rubber composition comprises about 0.05-2 phr (=weight parts per 100 weight parts rubber), more preferably about 0.1-1.5 phr, and most preferably about 0.15-1 phr organic peroxide.

The anti-oxidant is selected from the group of phenolic anti-oxidants, para-phenylidene diamine, and nitroxides. Contrary to other well-known anti-oxidants like monoamines and phosphites, the selected anti-oxidants are able to control the activity of the organic peroxides, meaning that they have proven to be able to prevent the occurrence of side effects of the peroxide addition: gelation, premature cross-linking, rubber viscosity increase and, as a consequence, complication of the rubber processing. Selecting the anti-oxidant from the group of phenolic anti-oxidants, para-phenylidene diamine, and nitroxides results in rubber viscosity levels suitable for rubber processing.

Examples of suitable phenolic anti-oxidants are those of class 3 of ASTM D4676, which include tert-butyl hydroquinone (TBHQ; CAS:1948-33-0), butylated hydroxytoluene (BHT), poly(dicyclopentadiene-co-p-cresol) (Vulkanox SKF; CAS: 068610-51-5), pentaerythritol tetrakis(3-(3,5-di-tert-butyl-4-hydroxyphenyl)propionate (Irganox 1010; CAS 6683-19-8), Octadecyl-3-(3,5-di-tert.butyl-4-hydroxyphenyl)-propionate (Irganox 1076; CAS 2082-79-3), bis-(2-hydroxy-3-tert-butyl-5-methylphenyl)methane (Vulkanox BKF, CAS: 000119-47-1), 4,4'-Thio-bis(6-tert-butyl-m-methylphenol (Santonox R, Santonox TBMC, Lowinox TBM-6; CAS 96-69-5), and 2,2'-thiobis(6-tert-butyl-4-methylphenol) (Lowinox TBP-6; CAS: 90-66-4).

Examples of suitable para-phenylidene diamines are those of class 1 of ASTM D4676, which include N-1,3-dimethylbutyl-N'-phenyl-p-phenylene diamine (Santoflex 6PPD; CAS: 793-24-8), N-Isopropyl-N'-phenyl-p-phenylendiamine (IPPD, Vulkanox 4010; CAS 000101-72-4), and N,N'-diphenyl-p-phenylenediamine (Vulkanox DPPD; CAS 74-31-7).

Examples of suitable nitroxides are 2,2,6,6-tetramethyl-1-piperidinyloxy free radical (TEMPO; CAS: 2564-83-2), 2,2,6,6-tetramethyl-4-hydroxy-1-piperidinyloxy free radical (OH-TEMPO or TEMPOL; CAS: 2226-96-2), 4-carboxy-2,2,6,6-tetramethyl-1-piperidinyloxy free radical (4-carboxy-TEMPO or TEMPACID; CAS: 37149-18-1), 2,2,6,6-tetramethyl-4-amino-1-piperidinyloxy free radical (4-amino-TEMPO or TEMPAMINE; CAS: 14691-88-4), and 2,2,6,6-tetramethyl-4-oxopiperidinooxy free radical (4-oxo-TEMPO or TEMPONE; CAS: 2896-70-0).

Also combinations of two or more of these anti-oxidants can be used, such combinations of a para-phenylidene diamine with a phenolic anti-oxidant or a nitroxide, e.g. 6PPD and OH-TEMPO. The latter combination results in a further improvement in filler-rubber interaction and a further decrease in filler-filler interaction.

It is also possible to use one of the above-mentioned anti-oxidants in combination with a different type of anti-oxidant, for instance a trimethyl-dihydroquinoline (TMQ).

The reinforced rubber composition preferably comprises about 0.01-4 phr, more preferably about 0.05-2 phr, and most preferably about 0.1-1 phr of one or more of anti-oxidant(s) selected from phenolics, para-phenylidene diamines, and nitroxides. In addition to these indicated antioxidants, significant amounts of other antioxidants can be added.

The resulting rubber composition can be mixed with a cure package and shaped and heated to instigate vulcanization.

The disclosure therefore further relates to a process for vulcanizing a reinforced rubber composition comprising the steps of:

preparing a mixture comprising:
(a) the reinforced rubber composition described above and
(b) a cure package, and shaping and heating said mixture to instigate vulcanization.

The cure package can be a sulfur cure package, which is generally a combination of elemental sulfur, sulfur cure accelerators and/or sulfur donors, cure activators such as ZnO and stearic acid, and optionally co-agents.

The term "elemental sulfur" refers to a compound with the formula Sn wherein n is at least about 1 and thus includes sulfur in its atomic, oligomeric, cyclic and/or polymeric state. Sulfur is preferably added to the reinforced rubber composition in an amount of about 0.1-2.5 phr, more preferably about 0.5-2.5 phr, and most preferably about 0.8-2 phr.

Examples of suitable sulfur cure accelerators and sulfur donors are benzothiazoles, benzothiazole sulfenamides, dithiocarbamates, and thiurams.

Examples of benzothiazoles are 2-mercaptobenzothiazole and 2,2'-dithiobisbenzothiazole.

Examples of benzothiazole sulfenamides are N-t-butyl-2-benzothiazole sulfenamide, N-cyclohexyl-2-benzothiazole sulfenamide, 2-morpholinothiobenzothiazole, and N-dicyclohexylbenzothiazole-2-sulfenamide. N-cyclohexyl-2-benzothiazole sulfenamide is a preferred sulfur cure accelerator, because it does not liberate unsafe nitrosamines upon use.

Examples of thiurams are thiuram polysulfides and thiuram monosulfides. Thiuram polysulfides include thiuram disulfides, thiuram trisulfides, thiuram tertrasulfides, and thiuram hexasulfides, wherein thiuram disulfides are the preferred thiurams.

Examples of thiuram disulfides are tetrabutylthiuram disulfide, tetramethylthiuram disulfide, tetraethylthiuram disulfide, isobutylthiuram disulfide, dibenzylthiuram disulfide, tetrabenzylthiuram disulfide, and tetra-isobutylthiuram disulfide. Tetrabenzylthiuram disulfide (TBzTD) is a preferred sulfur cure accelerator because it does not liberate unsafe nitrosamines upon use.

Examples of thiuram tetra- and hexasulfides are dipentamethylenethiuram tetrasulfide and dipentamethylenethiuram hexasulfide, respectively.

Examples of dithiocarbamares are bismuth dimethyldithiocarbamate, cadmium diethyldithiocarbamate, cadmium diamyldithiocarbamate, copper dimethyldithiocarbamate, lead diamyldithiocarbamate, lead dimethyldithiocarbamate, selenium diethyldithiocarbamate, selenium dimethyldithiocarbamate, tellurium diethyldithiocarbamate, piperidinium pentamethylene dithiocarbamate, zinc diamyldithiocarbamate, zinc diisobutyldithiocarbamate, zinc diethyldithiocarbamate, zinc dimethyldithiocarbamate, copper dibutyldithiocarbamate, sodium dimethyldithiocarbamate, sodium diethyldithiocarbamate, sodium dibutyldithiocarbamate, zinc di-n-butyldithiocarbamate, and zinc dibenzyldithiocarbamate.

Examples of thiuram monosulfides are tetramethylthiuram monosulfide, isobutylthiuram monosulfide, dibenzylthiuram monosulfide, tetrabenzylthiuram monosulfide, and tetra-isobutylthiuram monosulfide.

Examples of co-agents are 1,3-bis(citraconimidomethyl)benzene (Perkalink® 900), hexamethylene-1,6-bis(thiosulfate, disodium salt, dihydrate (Duralink® HTS), triallyl cyanurate (TAC), triallyl isocyanurate (TAIL), and trimethylolpropane trimethacrylate (TRIM).

Alternatively, the cure package is an organic peroxide cure package. Preferred organic peroxides for this purpose are dicumyl peroxide, trimeric cyclic methyl ethyl ketone peroxide, 2,5-dimethyl-2,5-di(tert-butylperoxy)hexane, and di(t-butylperoxyisopropyl)benzene. Apart from peroxides, also coagents can be added, such as poly-maleimides (including bis- and tris-maleimides), poly-citraconimides (including bis- and tris-citraconimides), 1,3-bis(citraconimidomethyl)benzene (Perkalink® 900), hexamethylene-1,6-bis(thiosulfate, disodium salt, dihydrate (Duralink® HTS), triallyl cyanurate (TAC), triallyl isocyanurate (TAIL), and trimethylolpropane trimethacrylate (TRIM).

Because all—or at least the vast majority—of the peroxide added in the reinforcing step has decomposed during said step, there will be no interference of that peroxide during the vulcanization step. Should the reinforcing rubber contain any organic peroxide residues after the reinforcing step, these residues will be decomposed during the vulcanization step, either thermally or by interaction with sulfur and sulfur accelerators/donors.

The cure package is preferably added in amounts of about 1-20 phr, preferably about 1-10 phr.

The cure package is preferably added to the rubber composition at low temperature (about 20-100° C.) using, for example, a two roll mill, a calender, or an (internal) mixer. The resulting mixture is placed in a mould and heated at a temperature in the range about 120-220° C., preferably about 130-200° C., and most preferably about 140-190° C.

EXAMPLES

Example 1

Natural rubber was pre-compounded with the conventional ingredients of a tread rubber composition: carbon-black, processing oil, anti-ozonant, and stabilizer. Details are presented in Table 1.

TABLE 1

| | | | |
|---|---|---|---|
| NR SVR-3L | phr | 100 | Natural rubber |
| FEF-N550 | phr | 30 | Carbon black |
| HAF-N330 | phr | 20 | Carbon black |
| Nytex 4700 | phr | 8 | Process oil |
| Santoflex 6PPD-pst | phr | 2 | Anti-oxidant |
| Flectol TMQ-pst | phr | 1 | Anti-oxidant |

The pre-compounded rubber was added to an internal mixer at 120° C. Different amounts of the following peroxides were added and the resulting mixture was first mixed with a mixer speed of 30 rpm for 2 minutes, after which the mixer speed was increased to 100 rpm. During mixing, the temperature rose to >150° C. After mixing for 2 minutes at 100 rpm, the mixture was dumped and cooled to room temperature.

Peroxides Used:

| | |
|---|---|
| 1,1-di(tert-butylperoxy)cyclohexane | Trigonox ® 22-C50 |
| 1,1-di(tert-butylperoxy)-3,3,5-trimethylcyclohexane | Trigonox ® 29-E90 |
| tert-butyl peroxy-2-ethylhexanoate | Trigonox ® 21S |
| Tert-butyl-peroxy-3,5,5-trimethylhexanoate | Trigonox ® 42S |
| 2,2-di(tert-butylperoxy)butane | Trigonox ® D |
| 1,1-bis(tert-butylperoxy)-2-isopropyl-5-methylcyclohexane | |

In order to determine the effect of the peroxide treatment on the viscosity of the resulting composition, the Mooney viscosity (at 100° C.) was measured according the ISO 289-85 and reported in Mooney Units (MU).

The results are displayed in Table 2. The amounts of peroxide used are indicated in phr, calculated as pure peroxide. The results show that increasing amounts of peroxides do not lead to a significant increase in viscosity. In other words: the rubber compounds retain proper processing properties.

Table 2 - Mooney viscosity (ML (1 + 4) MU)

|  | 0 phr | 0.05 phr | 0.1 phr | 0.2 phr | 0.3 phr |
|---|---|---|---|---|---|
| Trigonox ® 22-C50 | 41.6 | 39.0 | 42.7 | 43.7 | 47.7 |
| Trigonox ® 29-E90 | 44.2 | 42.0 | 37.7 | 40.8 | 41.3 |
| Trigonox ® 21S | 43.3 | 41.0 | 38.3 | 41.1 | 38.0 |
| Trigonox ® 42S | 41.6 | 41.9 | 41.8 | 41.9 | 40.6 |
| Trigonox ® D | 41.6 | 41.9 | 41.8 | 41.9 | 40.6 |
| Perketal of menthone and tert-butylhydroperoxide 30% | 40.4 | 40.2 | 40.6 | 38.2 | 39.0 |

The reinforced rubber compound was added to a two-roll mill and the following cure pack was added:

TABLE 3

| ZnO | 5 phr |
|---|---|
| Stearic acid | 2 phr |
| CBS | 1.5 phr |
| S | 1.5 phr |

In order to determine the cure kinetics, rheometer data were recorded; at 160° C., according to ISO 6502-1991 (Measurement of vulcanization characteristics with rotorless curemeters). Reported in Table 4 is the t90, i.e. the time to 90% of maximum torque level.

TABLE 4 t90 (min)

|  | 0 phr | 0.05 phr | 0.1 phr | 0.2 phr | 0.3 phr |
|---|---|---|---|---|---|
| Trigonox ® 22-C50 | 4 | 3.97 | 3.95 | 4 | 4.01 |
| Trigonox ® 29-E90 | 3.79 | 4.03 | 3.93 | 4.06 | 3.98 |
| Trigonox ® 21S | 4.11 | 4.17 | 4.1 | 4.24 | 4.32 |
| Trigonox ® 42S | 4.06 | 4.05 | 4.14 | 4.16 | 4.22 |
| Trigonox ® D | 4.06 | 4.05 | 4.14 | 4.16 | 4.22 |
| 1,1-bis(tert-butylperoxy)-2-isopropyl-5-methylcyclohexane | 3.74 | 3.74 | 3.83 | 3.76 | 3.87 |

The Payne effect of the rubber compound containing the cure pack, but before cure, was determined as described in The science and technology of rubber, 3rd edition, J. E. Mark, 2005, page 388. This test measures the Payne-effect of a filled system using a dynamic viscoelastic measurement. According to this experiment, the rubber sample was subjected to periodic shear strain at 100° C. and 0.7 Hz. The strain is varied from 0.3% to 100%. The measurement was performed on a rubber analyzer, a "Visco Elastograph" ex Gottfert. This test measures the relationship between the sample's elasticity modulus and the subjected strain and thereby evaluates the interaction between the rubber and the filler. The decrease of the Payne effect, reported as G' 0.7%-90%, is a good measure for the filler-filler interaction. The filler-filler interaction is a good indication for the filler-rubber interaction: a high filler-filler interaction indicates a low filler-rubber interaction and vice versa.

The results in Table 5 show that increasing amounts of peroxide lead to lower filler-filler interactions (lower Payne effect).

TABLE 5

Payne effect (kPa)

|  | 0 phr | 0.05 phr | 0.1 phr | 0.2 phr | 0.3 phr |
|---|---|---|---|---|---|
| Trigonox ® 22-C50 | 89.80 | 64.50 | 57.20 | 44.00 | 37.50 |
| Trigonox ® 29-E90 | 90.17 | 72.90 | 67.92 | 45.88 | 38.62 |
| Trigonox ® 21S | 90.66 | 78.54 | 84.64 | 65.92 | 64.32 |
| Trigonox ® 42S | 96.18 | 84.23 | 79.80 | 73.22 | 61.80 |
| Trigonox ® D | 96.18 | 84.23 | 79.80 | 73.22 | 61.80 |
| 1,1-bis(tert-butylperoxy)-2-isopropyl-5-methylcyclohexane | 105.45 | 86.75 | 78.57 | 64.96 | 53.87 |

The reinforced rubber compound, containing the cure pack, was added to a mould and cured at 160° C. for a period of time equaling twice the time to cure to 90% of the ultimate cure level (2*t90).

The extent of rubber reinforcement was determined measuring the difference in tensile moduli at 300% and 100% strain: M300-M100, determined using tensile testing according to ISO 37:1995.

A High M300-M100 value is a good indication for a high rubber reinforcement.

The results in Table 6 show that increased amounts of peroxides lead to improved rubber reinforcement.

TABLE 6

M300-M100

|  | 0 phr | 0.05 phr | 0.1 phr | 0.2 phr | 0.3 phr |
|---|---|---|---|---|---|
| Trigonox ® 22-C50 | 8.79 | 9.82 | 10.51 | 10.18 | 10.48 |
| Trigonox ® 29-E90 | 9.81 | 10.35 | 9.66 | 10.87 | 10.55 |
| Trigonox ® 21S | 9.44 | 10.13 | 9.66 | 10.24 | 10.1 |
| Trigonox ® 42S | 9.69 | 9.94 | 9.51 | 9.61 | 10.09 |
| Trigonox ® D | 9.69 | 9.94 | 9.51 | 9.61 | 10.09 |
| 1,1-bis(tert-butylperoxy)-2-isopropyl-5-methylcyclohexane | 9.45 | 9.73 | 9.93 | 10.07 | 10.70 |

The interaction parameter, which represents the filler-rubber interaction, was determined by taking the ratio (M300-M100)/(Payne effect).

The results in Table 7 show that the addition of peroxides leads to increased interaction parameters and, thus, improved filler-rubber interaction

TABLE 7

Interaction parameter

|  | 0 phr | 0.05 phr | 0.1 phr | 0.2 phr | 0.3 phr |
|---|---|---|---|---|---|
| Trigonox ® 22-C50 | 0.098 | 0.152 | 0.184 | 0.232 | 0.279 |
| Trigonox ® 29-E90 | 0.109 | 0.142 | 0.142 | 0.237 | 0.273 |
| Trigonox ® 21S | 0.104 | 0.129 | 0.114 | 0.155 | 0.157 |
| Trigonox ® 42S | 0.101 | 0.118 | 0.119 | 0.131 | 0.163 |
| Trigonox ® D | 0.099 | 0.142 | 0.192 | 0.272 | 0.306 |
| 1,1-bis(tert-butylperoxy)-2-isopropyl-5-methylcyclohexane | 0.090 | 0.112 | 0.126 | 0.155 | 0.199 |

The hysteresis losses of the cured rubber compounds, as an indicator for tyre rolling resistance, were determined by determining the tangent delta value (tan δ=ratio of the dynamic loss modulus over the dynamic storage modulus G"/G') at 60° C. on a strip of cured rubber (13 mm×38 mm, 2 mm thick), using oscillation (1% strain, 1 Hz), in an Anton-Paar viscometer.

Tan delta represents the energy loss upon stressing the cured rubber under oscillation, which is an indication of the rolling resistance of a tyre. Low tan delta values imply minimal energy loss under rolling conditions. Ideally, tan delta is as low as possible.

Table 8 shows that addition of peroxide leads to a decrease in tan delta.

TABLE 8

Tan delta at 60° C.

|  | 0 phr | 0.05 phr | 0.1 phr | 0.2 phr | 0.3 phr |
|---|---|---|---|---|---|
| Trigonox ® 22-C50 | 0.136 | 0.126 | 0.111 | 0.091 | 0.071 |
| Trigonox ® 29-E90 | 0.125 | 0.106 | 0.123 | 0.079 | 0.079 |
| Trigonox ® 21S | 0.134 | 0.134 | 0.141 | 0.117 | 0.120 |
| Trigonox ® 42S | 0.144 | 0.136 | 0.140 | 0.122 | 0.110 |
| Trigonox ® D | 0.133 | 0.115 | 0.103 | 0.087 | 0.077 |
| 1,1-bis(tert-butylperoxy)-2-isopropyl-5-methylcyclohexane | 0.137 | 0.137 | 0.125 | 0.120 | 0.094 |

Example 2

Following the procedure of Example 1, the rubber compositions of Table 9 were prepared.

TABLE 9

|  |  | 1 | 2 | 3 | 4 | 5 | 6 |
|---|---|---|---|---|---|---|---|
| NR SVR-3L | natural rubber | 100 | 100 | 100 | 100 | 100 | 100 |
| FEF-N550 | carbon black | 30 | 30 | 30 | 30 | 30 | 30 |
| HAF-N330 | carbon black | 20 | 20 | 20 | 20 | 20 | 20 |
| Nytex 4700 | processing oil | 8 | 8 | 8 | 8 | 8 | 8 |
| santoflex 6PPD | Anti-oxidant | — | — | 1 | — | 1 | 2 |
| Trigonox ® 29 E90 | Peroxide | — | — | — | 0.44 | 0.44 | 0.44 |
| Thermal treatment? |  | NO | YES | YES | YES | YES | YES |

TABLE 9-continued

|  |  | 1 | 2 | 3 | 4 | 5 | 6 |
|---|---|---|---|---|---|---|---|
| Mooney viscosity | ML(1 + 4) 100° C. | 48.1 | 30.6 | 34.6 | 58.5 | 35.8 | 33.3 |

Table 9 shows that when the rubber compound, without anti-oxidant and peroxide, is heat treated, the rubber degrades, leading to a lower Mooney viscosity (compare experiments 1 and 2). Addition of the anti-oxidant (experiment 3) has a protective effect on the degradation, as illustrated by a lower reduction in viscosity.

Addition of peroxide in the absence of anti-oxidant (experiment 4), leads to a significant increase in viscosity. This indicates the occurrence of undesirable crosslinking. The resulting compound was difficult to process.

The addition of both a peroxide and an anti-oxidant (experiments 5 and 6), did not result in such crosslinking.

Example 3

Example 2 was repeated using different anti-oxidants, as displayed in Table 10.

TABLE 10

|  |  | 7 | 8 | 9 | 10 | 11 | 12 | 13 | 14 |
|---|---|---|---|---|---|---|---|---|---|
| NR SVR-3L |  | 100 | 100 | 100 | 100 | 100 | 100 | 100 | 100 |
| FEF-N550 |  | 30 | 30 | 30 | 30 | 30 | 30 | 30 | 30 |
| HAF-N330 |  | 20 | 20 | 20 | 20 | 20 | 20 | 20 | 20 |
| Nytex 4700 |  | 8 | 8 | 8 | 8 | 8 | 8 | 8 | 8 |
| Naugard Q (TMQ)[1] | anti-oxidant | 1 |  |  |  |  |  |  |  |
| Wingstay 29-70%[2] | anti-oxidant |  | 1 |  |  |  |  |  |  |
| Vulkanox BKF | anti-oxidant |  |  | 1 |  |  |  |  |  |
| Vulkanox SKF | anti-oxidant |  |  |  | 1 |  |  |  |  |
| Lowinox TBP6 | anti-oxidant |  |  |  |  | 1 |  |  |  |
| TBHQ | anti-oxidant |  |  |  |  |  | 1 |  |  |
| Irgafos 168[3] | anti-oxidant |  |  |  |  |  |  | 1 |  |
| OH-TEMPO | anti-oxidant |  |  |  |  |  |  |  | 1 |
| Trigonox 29 E90 |  | 0.44 | 0.44 | 0.44 | 0.44 | 0.44 | 0.44 | 0.44 | 0.44 |
| Thermal treatment |  | YES | YES | YES | YES | YES | YES | YES | YES |
| Mooney viscosity | ML(1 + 4) 100° C. | 52.1 | 55.5 | 30.5 | 32.2 | 32.6 | 27.2 | 51.2 | 17.6 |

[1]Naugard Q (TMQ): 1,2-dihydro-2,2,4-trimethylquinoline polymer, CAS 26780-96-1
[2]Wingstay 29-70%: styrenated diphenylamine CAS: 68442-68-2
[3]Irgafos 168: tris(2,4-di-tert-butylphenyl)phosphite CAS: 31570-04-4

Table 10 shows that the amine anti-oxidants (Naugard Q and Wingstay 29) and phosphite anti-oxidants (Irgafos 168) are ineffective. Despite their presence, the viscosity increases, meaning that crosslinking occurs.

Example 4

Example 3 was repeated using a combination of anti-oxidants, as displayed in Table 11.

This combination of anti-oxidants is a conventional package for stabilizing tread rubber compounds. The 2 phr Santoflex 6PPD were sufficient to protect the rubber compound against the undesirable viscosity-increasing effect of the peroxide.

TABLE 11

|  | 15 | 16 | 17 | 18 | 19 | 20 |
|---|---|---|---|---|---|---|
| NR SVR-3L | 100 | 100 | 100 | 100 | 100 | 100 |
| FEF-N550 | 30 | 30 | 30 | 30 | 30 | 30 |
| HAF-N330 | 20 | 20 | 20 | 20 | 20 | 20 |
| Nytex 4700 | 8 | 8 | 8 | 8 | 8 | 8 |
| Flectol (TMQ) | 1 | 1 | 1 | 1 | 1 | 1 |
| Santoflex 6PPD | 2 | 2 | 2 | 2 | 2 | 2 |
| OH-TEMPO |  |  |  |  | 0.1 | 0.2 |
| Trigonox 29 E90 |  | 0.22 | 0.44 | 0.44 | 0.44 |  |
| Thermal treatment | NO | YES | YES | YES | YES | YES |
| Mooney viscosity | 67.1 | 37.8 | 37.4 | 37.4 | 27.7 | 25.6 |
| Payne effect (kPa) | 117.5 | 102.4 | 57.3 | 46.1 | 30.26 | 33.4 |
| Interaction parameter | 0.069 | 0.083 | 0.159 | 0.215 | 0.326 | 0.282 |
| Tan delta @60° C. | 0.119 | 0.126 | 0.098 | 0.083 | 0.080 | 0.091 |

Entry 18 shows that a level 0.44 phr peroxide has no negative impact on the viscosity. Table 10, entry 14 (see Example 3) shows that a high level of OH-TEMPO leads to peptization (controlled chain degradation) of the rubber. Lower levels of OH-TEMPO (entries 19 and 20) allow for a further reduction in Payne effect and improvement in the interaction parameter.

The optimum result of 0.1 phr OH-TEMPO (entry 19) compared to 0.2 phr OH-TEMPO (entry 20) can be explained by radical scavenging of the peroxide by increasing amounts of OH-TEMPO

Example 5

Emulsion styrene-butadiene rubber (e-SBR) was pre-compounded with silica and extender oil, by mixing the ingredients for 3 minutes at 120° C. in an internal mixer. Details are presented in Table 12.

TABLE 12

| eSBR Buna SE1502 | 100 phr | e-SBR rubber |
|---|---|---|
| Ultrasil VN3 GR | 80 phr | Precipitated silica |
| Vivatec 500 TDAE | 30 phr | TDEA oil |

Different amounts of peroxide and anti-oxidant were added and the resulting mixture was first mixed with a speed of 30 rpm, After 2 minutes, the mixer speed was increased to 50 rpm, after which the temperature rose to >150° C. After mixing for 8-9 minutes, the mixture was dumped and cooled to room temperature.

The rubber compound was added to a two-roll mill (40° C.) and the following cure pack was added:

TABLE 13

| Sulfur (Crystex) | 1.3 phr |
|---|---|
| TBBS | 1.3 phr |
| ZnO | 3.0 phr |
| Stearic acid | 1.0 phr |
| TBzTD | 0.3 phr |

After this curative mixing, the resulting compounds were added to a hot mould, and cured at 160° C. for 25 minutes into 2 mm thick cured sheets. After curing, the mechanical properties were evaluated using tensile testing (according to ISO 37:1995) and hardness (IRHD, ISO 48:2010).

Table 14 shows that there is a significant effect of the level of anti-oxidant on the reinforcement and rubber-filler interaction.

It should be noted these experiments with e-SBR could not be performed without an anti-oxidant selected from phenolics, para-phenylidene diamines, and nitroxides, because their absence lead to completely un-processable crumbs.

TABLE 14

| eSBR Buna SE1502 | 100 | 100 | 100 | 100 | 100 | 100 |
|---|---|---|---|---|---|---|
| Ultrasil VN3 GR | 80 | 80 | 80 | 80 | 80 | 80 |
| Vivatec 500 TDAE | 30 | 30 | 30 | 30 | 30 | 30 |
| TMQ | 1 | 1 | 1 | 1 | 1 | 1 |
| 6PPD | 1 | 2 | 2 | 1 | 1 | 2 |
| Tx29 E90 | 0.00 | 0.00 | 0.35 | 0.35 | 0.47 | 0.44 |
| IRHD | 89.3 | 88.8 | 88.3 | 86.7 | 86.2 | 89.1 |
| Tensile strength [N/mm$^2$] | 10.89 | 9.75 | 9.96 | 9.21 | 9.24 | 10.61 |
| Elongation at break [%] | 971 | 1064 | 910 | 725 | 617 | 845 |
| M300-M100 | 1.17 | 0.73 | 1.59 | 2.49 | 3.04 | 2.21 |
| Payne G' 0.7%-90% [MPa] | 2.252 | 2.253 | 1.726 | 1.567 | 1.526 | 1.524 |
| Interaction parameter | 0.52 | 0.32 | 0.92 | 1.59 | 1.99 | 1.45 |
| Δ interaction parameter | 0.00 | 0.00 | 0.60 | 1.07 | 1.47 | 1.13 |

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. Process for preparing a reinforced rubber composition, said process comprising the steps of:
    A. mixing, at a temperature of at least 120° C., at least the following compounds:
        (i) a rubber,
        (ii) carbon black present in an amount of from 50 to 80 phr,
        (iii) at least one organic peroxide comprising 1-di(tert-butylperoxy)-3,3,5-trimethylcyclohexane present in an amount of 0.22 to 0.44 phr, and
        (iv) at least one anti-oxidant comprising N-1,3-dimethylbutyl-N'-phenyl-p-phenylene diamine present in an amount of 1 to 2 phr, thereby preparing an uncured reinforced rubber composition; and
    B. cooling the uncured reinforced rubber composition prepared in step A;
    wherein the reinforced rubber composition is free of inorganic fillers that are not carbon black.

2. The process of claim 1 wherein the at least one anti-oxidant further comprises 1,2-dihydro-2,2,4-trimethylquinoline polymer.

3. The process of claim 2 wherein the 1,2-dihydro-2,2,4-trimethylquinoline polymer is present in an amount of about 1 phr.

4. The process of claim 1 that is free of 2,2,6,6-tetramethyl-4-hydroxy-1-piperidinyloxy free radical (OH-TEMPO).

5. The process of claim 2 that is free of 2,2,6,6-tetramethyl-4-hydroxy-1-piperidinyloxy free radical (OH-TEMPO).

6. The process of claim 1 wherein the rubber is selected from the group consisting of ethylene propylene diene terpolymer elastomer (EPDM), ethylene-propylene copolymer elastomer (EPM), ethylene-vinyl acetate (EVA and EVM), natural rubber (NR), butyl rubber (BR), isoprene rubber (IR), bromobutylrubber (BIIR), styrene-butadiene rubber, polysulfides (T), butyl rubber (IIR), nitrile rubber (NBR), hydrogenated nitrile rubber (HNBR), and combinations thereof.

7. The process of claim 1 wherein the at least one organic peroxide and optionally the at least one anti-oxidant is/are added to the rubber and the carbon black in the form of a solid formulation comprising about 10-50 wt % the at least one organic peroxide and about 0-50 wt % of the at least one anti-oxidant, dispersed either on about 5-45 wt % of a solid inorganic carrier or in about 10-50 wt % of a rubber, each weight percent based on a total weight of the solid formulation.

8. The process of claim 1 wherein the at least one organic peroxide and the at least one anti-oxidant are added to the rubber and the carbon black in the form of a liquid formulation comprising about 10-50 wt % of the at least one organic peroxide, about 5-45 wt % of the at least one anti-oxidant, and about 0-50 wt % of a solvent, each weight percent based on a total weight of the liquid formulation.

9. The process of claim 1 wherein
the rubber is selected from the group consisting of ethylene propylene diene terpolymer elastomer (EPDM), ethylene-propylene copolymer elastomer (EPM), ethylene-vinyl acetate (EVA and EVM), natural rubber (NR), butyl rubber (BR), isoprene rubber (IR), bromobutylrubber (BIIR), styrene-butadiene rubber, polysulfides (T), butyl rubber (IIR), nitrile rubber (NBR), hydrogenated nitrile rubber (HNBR), and combinations thereof; and
the at least one organic peroxide and optionally the at least one anti-oxidant is/are added to the rubber and the carbon black in the form of a solid formulation comprising about 10-50 wt % the at least one organic peroxide and about 0-50 wt % of the at least one anti-oxidant, dispersed either on about 5-45 wt % of a solid inorganic carrier or in about 10-50 wt % of a rubber, each weight percent based on a total weight of the solid formulation.

10. The process of claim 9 wherein the at least one anti-oxidant further comprises 1,2-dihydro-2,2,4-trimethylquinoline polymer.

11. The process of claim 10 that is free of 2,2,6,6-tetramethyl-4-hydroxy-1-piperidinyloxy free radical (OH-TEMPO).

12. The process of claim 1 wherein
the rubber is selected from the group consisting of ethylene propylene diene terpolymer elastomer (EPDM), ethylene-propylene copolymer elastomer (EPM), ethylene-vinyl acetate (EVA and EVM), natural rubber (NR), butyl rubber (BR), isoprene rubber (IR), bromobutylrubber (BIIR), styrene-butadiene rubber, polysulfides (T), butyl rubber (IIR), nitrile rubber (NBR), hydrogenated nitrile rubber (HNBR), and combinations thereof; and
the at least one organic peroxide and the at least one anti-oxidant are added to the rubber and the carbon black in the form of a liquid formulation comprising about 10-50 wt % of the at least one organic peroxide, about 5-45 wt % of the at least one anti-oxidant, and about 0-50 wt % of a solvent, each weight percent based on a total weight of the liquid formulation.

13. The process of claim 12 wherein the at least one anti-oxidant further comprises 1,2-dihydro-2,2,4-trimethylquinoline polymer.

14. The process of claim 13 that is free of 2,2,6,6-tetramethyl-4-hydroxy-1-piperidinyloxy free radical (OH-TEMPO).

15. The process of claim 1 wherein the at least one anti-oxidant further comprises 1,2-dihydro-2,2,4-trimethylquinoline polymer.

16. The process of claim 15 that is free of 2,2,6,6-tetramethyl-4-hydroxy-1-piperidinyloxy free radical (OH-TEMPO).

17. Process for preparing a reinforced rubber composition, said process comprising the steps of:
A. mixing, at a temperature of at least 120° C., at least the following compounds:
a rubber selected from the group consisting of ethylene propylene diene terpolymer elastomer (EPDM), ethylene-propylene copolymer elastomer (EPM), ethylene-vinyl acetate (EVA and EVM), natural rubber (NR), butyl rubber (BR), isoprene rubber (IR), bromobutylrubber (BIIR), styrene-butadiene rubber, polysulfides (T), butyl rubber (IIR), nitrile rubber (NBR), hydrogenated nitrile rubber (HNBR), and combinations thereof;
(ii) carbon black present in an amount of from 50 to 80 phr,
(iii) at least one organic peroxide comprising 1-di(tert-butylperoxy)-3,3,5-trimethylcyclohexane present in an amount of 0.22 to 0.44 phr, and
(iv) at least one anti-oxidant comprising N-1,3-dimethylbutyl-N'-phenyl-p-phenylene diamine present in an amount of 1 to 2 phr and 1,2-dihydro-2,2,4-trimethylquinoline polymer present in an amount of about 1 phr, thereby preparing an uncured reinforced rubber composition; and
B. cooling the uncured reinforced rubber composition prepared in step A;
wherein the reinforced rubber composition is free of inorganic fillers that are not carbon black.

18. Process for preparing a reinforced rubber composition, said process comprising the steps of:
A. mixing, at a temperature of at least 120° C., at least the following compounds:
(i) a natural rubber;
(ii) carbon black present in an amount of from 50 to 80 phr,
(iii) at least one organic peroxide comprising 1-di(tert-butylperoxy)-3,3,5-trimethylcyclohexane present in an amount of 0.22 to 0.44 phr, and
(iv) at least one anti-oxidant comprising N-1,3-dimethylbutyl-N'-phenyl-p-phenylene diamine present in an amount of 1 to 2 phr and 1,2-dihydro-2,2,4- trimethylquinoline polymer present in an amount of about 1 phr, thereby preparing an uncured reinforced rubber composition; and B. cooling the uncured reinforced rubber composition prepared in step A;

wherein the reinforced rubber composition is free of inorganic fillers that are not carbon black.

\* \* \* \* \*